United States Patent Office 2,997,459
Patented Aug. 22, 1961

2,997,459
THERMOPLASTIC SYNTHETIC MATERIALS OF THE POLYCARBONATE TYPE AND PROCESS FOR PRODUCING THE SAME
Hermann Schnell and Walter Kimpel, Krefeld-Urdingen, Ludwig Bottenbruch and Heinrich Krimm, Krefeld-Bockum, and Gerhard Fritz, Krefeld, Germany, assignors to Farbenfabriken Bayer Aktiengesellschaft, Leverkusen, Germany, a corporation of Germany
No Drawing. Filed May 8, 1956, Ser. No. 583,382
Claims priority, application Germany May 13, 1955
7 Claims. (Cl. 260—47)

It is known to produce thermoplastic synthetic materials by inter-esterification of dialkyl carbonates with glycols. The products obtained have attained no technical importance because of their low softening points.

Further polycarbonates have been produced by reacting polyfunctional phenols containing several hydroxyl groups on one aromatic nucleus, for example hydroquinone and resorcinol, with phosgene. The polycarbonates obtained in this way are however insoluble in the solvents normally used and decompose at their melting points.

Finally, there have also been described plasticisers and binding agents in the form of high molecular polycarbonates produced by reacting poly-(chlorocarbonic acid)-esters of polyhydric alcohols with polyhydric phenols.

Technically valuable thermoplastic synthetic materials which are high molecular compounds of the polycarbonate type are obtainable according to the following proposals: by reacting certain di-monohydroxyarylene alkanes (U.S. applications Serial Numbers 461,938, filed October 12, 1954, and 557,256, filed January 4, 1956 or mixtures of di-monohydroxyarylene alkanes and aliphatic, cycloaliphatic and/or aromatic dihydroxy compounds (U.S. application Serial Number 572,802 filed March 21, 1956, or di-monohydroxy arylene sulphones (U.S. application Serial Number 572,793 filed March 21, 1956, with derivatives of the carbonic acid such as phosgene, bis-chlorocarbonic acid esters of such dihydroxy compounds or diesters of carbonic acid.

The objects of the present invention are new thermoplastic synthetic materials of the polycarbonate type and processes for producing the same. These new polycarbonates contain the dioxy residues of at least one aromatic dihydroxy hydrocarbon selected from the group consisting of dihydroxybenzene, dihydroxynaphthalene, dihydroxydiphenyl and dihydroxydinaphthalene, and the dioxy residues of at least one dihydroxy compound selected from the group consisting of saturated aliphatic and cycloaliphatic dihydroxy compounds.

According to the present invention these high molecular thermoplastic synthetic materials, which are in general similar to the aforementioned materials, are obtained by transforming into mixed polycarbonates, mixtures comprising at least one aromatic di-hydroxy hydrocarbon selected from the group consisting of dihydroxybenzene, dihydroxynaphthalene, dihydroxydiphenyl and dihydroxydinaphthalene and at least one saturated aliphatic or cycloaliphatic dihydroxy compound.

In respect of the aforementioned fact that aromatic dihydroxy compounds only and on the other side aliphatic or cycloaliphatic dihydroxy compounds only give polycarbonates of little value, it is surprising that technically very useful products are obtained by using mixtures of aromatic and aliphatic or cycloaliphatic dihydroxy compounds according to the invention.

As aromatic dihydroxy hydrocarbons suitable for use according to the invention there may be named, for example, hydroquinone, resorcinol, pyrocatechol, 4,4'-dihydroxydiphenyl, 2,2'-dihydroxydiphenyl, cyclohexyl-4,4'-dihydroxydiphenyl, 1,4-dihydroxynaphthalene, 1,6-dihydroxynaphthalene, 2,6-dihydroxynaphthalene, 1,2-dihydroxynaphthalene, 1,5-dihydroxynaphthalene, 2,2'-dihydroxydinaphthyl-1,1' and o-, m- or p-hydroxybenzyl alcohol.

As saturated aliphatic or cycloaliphatic dihydroxy compounds to be used according to the invention, there may be named: ethylene glycol, diethylene glycol, triethylene glycol, polyethylene glycol, thiodiglycol, ethylene dithiodiglycol, propanediol-1,2, propanediol-1,3, butanediol-1,3, butanediol-1,4, 2-methylpropanediol-1,3, pentanediol-1,5, 2-ethylpropanediol-1,3, hexanediol-1,6, octanediol-1,8, 2-ethylhexanediol-1,3, decanediol-1,10, cyclohexanediol-1,4, cyclohexanediol-1,2, o-, m- or p-xylylene glycol, 2,2-(4,4'-dihydroxydicyclohexyl)-propane, 4,4'-dihydroxydicyclohexyl methane and 2,6-dihydroxydecahydronaphthalene.

The transformation of the foregoing dihydroxy compounds into high molecular polycarbonates can be carried out in various ways known per se. Mixtures of aliphatic or cycloaliphatic dihydroxy compounds and aromatic dihydroxy hydrocarbons mentioned above can be re-esterified with dialkyl- or diaryl carbonates, or aliphatic or cycloaliphatic dihydroxy compounds can be re-esterified with arylene-bis-(alkyl-, cycloalkyl, or arylcarbonates) at elevated temperatures from about 50° C. to about 330° C. and optionally under reduced pressure, re-esterifying catalysts preferably being added.

As dialkyl- and diarylcarbonates suitable for this purpose there may be mentioned for instance: the dimethyl-, diethyl-, dipropyl-, dibutyl-, diamyl-, dioctyl-, dicyclohexyl-, and especially the diphenyl- and di-o-, m- or p-toluyl carbonate, or mixed esters, for instance the methyl-ethyl, the methyl-propyl, the ethyl-propyl, the methyl-cyclohexyl, the ethyl-cyclohexyl, the propyl-cyclohexyl, the methyl-phenyl, the ethyl-phenyl, the propylphenyl, the ethyl-o-, m- or p-toluyl and the cyclohexylphenyl carbonate.

As arylene-bis-(alkyl-, cycloalkyl- or arylcarbonates) there may be used for instance: phenylene-, diphenylene-, cyclohexyl - diphenylene- and naphthalene-bis-(methyl-, ethyl-, propyl-, butyl-, amyl-, octyl-, cyclohexyl-, phenyl-, o-, m-, or p-cresyl- and naphthyl carbonate).

Suitable re-esterifying catalysts are inorganic bases, for example caustic soda and potassium hydroxide, high boiling organic bases, such as acridine, metal hydrides, such as lithium and calcium hydride, alkali or alkaline earth metals, such as sodium, potassium, magnesium, and calcium, metal oxides, such as zinc oxide, aluminum oxide, lead oxide, antimonotrioxide, cerium oxide, and boron oxide, acids, such as phosphoric acid and p-toluene sulphonic acid, and salts, such as sodium benzoate, calcium acetate, and boron phosphate, and alcoholates and phenolates.

Furthermore bis-chlorocarbonic acid esters of aromatic dihydroxy hydrocarbons can be reacted with aliphatic or cycloaliphatic dihydroxy compounds, if desired in the presence of acid binding agents or their alkali metal compounds, and in the presence of indifferent solvents.

Suitable bis-chlorocarbonic acid esters of aromatic dihydroxy hydrocarbons are for instance: the phenylene-, the diphenylene-, the naphthylene- and the dinaphthylene-bis-(chlorocarbonic acid esters).

The polycarbonates can also be produced by introducing phosgene or a phosgene solution into solutions or suspensions of mixtures of the aforementioned dihydroxy compounds in organic tertiary bases, especially pyridine, optionally in the presence of reaction inert organic solvents, or by introducing phosgene or a phosgene solution into aqueous alkali solutions or suspensions of the aforementioned dihydroxy compounds, optionally in the presence of reaction inert organic solvents.

Under the acid binding agents there may be mentioned for instance: dimethylaniline, diethylaniline, trimethylaniline and pyridine.

As reaction inert solvents there may be used: petrol, ligroin, cyclohexane, methylcyclohexane, benzene, toluene, xylene, chloroform, methylenechloride, carbon tetrachloride, trichloroethylene, di-chloroethane, methylacetate, and ethylacetate.

In the production of polycarbonates from bis-chlorocarbonic acid esters and dihydroxy compounds in aqueous alkali solutions or suspensions or in the reaction of the foregoing dihydroxy compounds in aqueous alkali solutions or suspensions and possibly in the presence of reaction inert organic solvents with phosgene or a solution thereof, it is suitable to add during the reaction a small quantity of a quaternary ammonium compound such as triethylbenzyl ammonium chloride, to accelerate the reaction.

Quaternary ammonium compounds are for instance: tetramethylammoniumhydroxide, triethyloctadecylammoniumchloride, trimethylbenzylammoniumfluoride, triethylbenzylammoniumchloride, dimethyldodecylammoniumchloride, dimethylbenzylphenylammoniumchloride, trimethylcyclohexylammoniumbromide and N-methylpyridiniumchloride. They may be used in amounts from about 0.05 to about 5% by weight. They may be added to the reaction mixture before or during the reaction. Room temperature or temperatures from about 0° C. to about 100° C. are preferred.

The high molecular mixed polycarbonates produced according to the processes described, from the mixture of aforementioned dihydroxy compounds, are fusible, elastic synthetic materials whose melting or softening points and physical properties depend considerably upon the type and quantity of the dihydroxy compounds applied. The polycarbonates are frequently soluble in organic solvents, e.g. methylene chloride, chloroform, ethylene chloride, benzene, xylene, acetone, cyclohexanone, pyridine and dimethyl formamide and can be worked up from such solutions into shaped bodies such as films, filaments or bands or lacquer coatings. Since they are fusible they can also be worked up by pressing or spraying into clear transparent colourless mouldings or coatings.

Polycarbonates are also surprisingly here obtained which can be orientated by stretching, whereby the mechanical and chemical stability is greatly improved. The polycarbonates produced according to the invention can be worked up with plasticizers such as tricresyl phosphate or fillers such as asbestos and glass fibres.

The following examples are given for the purpose of illustrating the invention, the parts being by weight:

*Example 1*

21.4 parts of cyclohexyl-4,4'-dihydroxydiphenyl
2.8 parts of 4,4'-dihydroxy diphenyl
0.6 part of hexanediol-1,6
23.0 parts of diphenyl carbonate and
0.004 part of the sodium salt of 4,4'-dihydroxydiphenyl are melted together under nitrogen. At 170–200° C. the phenol formed by the re-esterification distills off under reduced pressure. The mixture is then maintained at a pressure of 0.3 mm. mercury gauge for a further half hour at 200° C. and for two hours at 250° C. The end-product is a colourless thermoplastic material melting at 210–230° C., soluble in toluene, methylene chloride, chloroform and other solvents and especially suitable for the production of films, injection mouldings and pressings.

*Example 2*

A mixture of 21.4 parts of cyclohexyl-4,4'-dihydroxydiphenyl
1.1 parts of hydroquinone
1.16 parts of cyclohexanediol-1,4
23.0 parts of diphenyl carbonate, and
0.005 part of lithium hydride is heated to 170–200° C. under a pressure of 100–12 mms. mercury gauge and the major quantity of the separated phenol is distilled off. Finally, the pressure is reduced to 0.3 mm. mercury gauge and the mixture stirred for 2½ hours at 250° C. The highly viscous melt thereby obtained is a colourless thermoplastic material, soluble for example, in toluene, methylene chloride, chlorobenzene and chloroform. The product has a softening range of 200–240° C. and may be worked up from solutions, or from the melt, to shaped bodies. Because of its good solubility and high temperature stability it possesses especial technical interest for lacquers.

*Example 3*

To a mixture of 11.75 parts of 1,4-phenylene-bis-(chlorocarbonic acid ester),
11.52 parts of 2,2-(4,4'-dihydroxydicylclohexyl)-propane, and
26.0 parts of absolute methylene chloride there are added dropwise with stirring at 0° C. within 35 minutes a solution of 11.85 parts of absolute pyridine in 55 parts of absolute methylene chloride. The mixture is stirred for a further 15 hours at room temperature; the methylene chloride solution is then washed with dilute hydrochloric acid and water, dried over sodium sulphate and the methylene chloride evaporated under reduced pressure. A tough elastic transparent colourless thermoplastic material remains with a softening range of 270°–275° C., soluble for example in methylene chloride, chloroform, pyridine, and dimethyl formamide, and may be worked up from solutions or from the melt into shaped bodies.

*Example 4*

To a mixture of 23.5 parts of 1,4-phenylene-bis-(chlorocarbonic acid ester)
11.8 parts of hexanediol-1,6, and
500 parts of dry benzene 24 parts of dry pyridine are added dropwise, with stirring within one hour, at 8–10° C. After 10 hours' stirring at room temperature the mixture, consisting of polycarbonate and pyridine hydrochloride, is filtered off, triturated with dilute hydrochloric acid, filtered again and washed neutral with water. After drying, a powdery thermoplastic material is obtained which is soluble, e.g. in butyl acetate, chloroform, methylene chloride, cyclohexanone, dimethylformamide, tetrahydrofurane and dioxane; having a softening range of 150–170° C. It is suitable for thermoplastic working into mouldings and for the production of films from solutions.

Example 5

To a mixture of 23.5 parts of 1,4-phenylene-bis-(chlorocarbonic acid ester)
6.2 parts of ethylene glycol, and
500 parts of dry benzene 24 parts of dry pyridine are added dropwise with stirring at 8–10° C. After 8 hours' stirring at room temperature the mixture, consisting of polycarbonate and pyridine hydrochloride, is filtered off and washed with dilute hydrochloric acid and then with water. After drying, a powdery thermoplastic material is obtained, soluble e.g. in methylene chloride, cyclohexanone and dimethylformamide and having a softening range of 200–220° C. It is suitable for the production of mouldings and filaments from the melt, and of films from solutions.

Example 6

A mixture of 14.5 parts of 1,3-phenylene-bis-(phenyl carbonate)
4.2 parts of 4,4'-diphenylene-bis-(phenyl carbonate)
12.1 parts of cyclohexyl-4,4'-dihydroxydiphenyl
0.6 part of hexanediol-1,6, and
0.004 part of lithium hydride is melted together, with stirring, and introduction of nitrogen. The separating phenol is distilled off at 200° C. under a pressure of 50–15 mms. mercury gauge. The pressure is then reduced to 0.3 mm. mercury gauge and heating continued for 1 hour to 230° C. and for a further two hours at 250° C. The colourless thermoplastic material obtained softens at above 200° C. and is suitable for working up as a thermoplastic or for the production of films.

Example 7

A mixture of 37 parts of 1,3-phenylene-bis-(phenyl carbonate)
10 parts of hydroquinone
1.2 parts of hexanediol-1,6, and
0.001 part of lithium hydride is melted under nitrogen while stirring. The bulk of the phenol formed by the re-esterification is distilled off at 160–200° C. under a pressure of 100 mms. mercury gauge. Then the pressure is decreased to one mm. mercury gauge and under continuing the heating at a temperature of 240–250° C. the polycondensation is completed to the extent desired. A lightly yellowish product with a softening range of 190–230° C. is obtained, soluble for instance in methylene chloride, chloroform and chlorobenzene. It may be worked up to shaped bodies in manners known per se.

Example 8

Into a mixture of 55 parts of resorcinol (0.5 mol)
59 parts of hexanediol-1,6 (0.5 mol)
164 parts of caustic soda (4.1 mols)
1000 parts of water and
200 parts of methylene chloride
148 parts of phosgene (1.5 mols)

are introduced under nitrogen while stirring at 20–25° C. during 2 hours. After further 2 hours the organic layer becomes viscous. After diluting with methylene chloride the solution is washed neutral with water, separated and dried over sodium sulphate. After distilling off the solvent a clear colourless plastic material with a softening range of 140–160° C. is obtained. It is clearly soluble in chlorohydrocarbons, aromatic hydrocarbons and esters.

We claim:

1. A linear, high molecular weight, thermoplastic, fiber-forming and film-forming polycarbonate resin orientable by stretching consisting essentially of a chain of divalent aromatic radicals mixed with divalent non-aromatic radicals in a ratio of about 95:5 mols to about 50:50 mols, said aromatic and non-aromatic radicals being linearly connected, one to the next, by the carbonate ester bridge

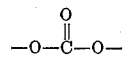

the aromatic radicals being selected from the group consisting of

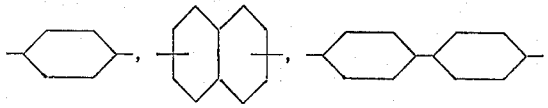

and

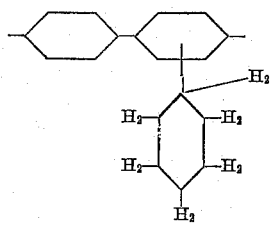

and

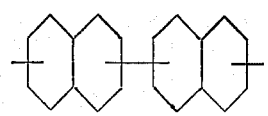

the non-aromatic radicals being selected from the group consisting of xylylene radicals, an alkylene radical having no more than 10 carbon atoms, unsubstituted cycloalkylene radicals, the 4,4'-dicyclohexylene methane and the 2,2-(4,4'-dicyclohexylene)-propane radical.

2. The product as set forth in claim 1 in which the aromatic radicals are:

3. The product as set forth in claim 1 in which the aromatic radicals are:

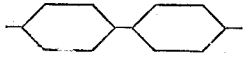

4. The product as set forth in claim 1 in which the aromatic radicals are:

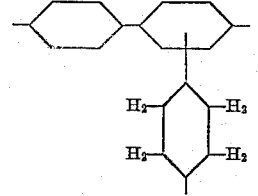

5. The product as set forth in claim 1 in which the non-aromatic radicals are: —CH$_2$(CH$_2$)$_4$CH$_2$—.

6. The product as set forth in claim 1 in which the non-aromatic radicals are: —CH$_2$—CH$_2$—.

7. The product as set forth in claim 1 in which the non-aromatic radicals are:

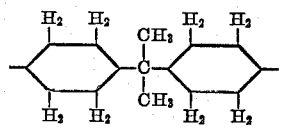

References Cited in the file of this patent

UNITED STATES PATENTS

| | | |
|---|---|---|
| 2,035,578 | Wagner | Mar. 31, 1936 |
| 2,210,817 | Peterson | Aug. 6, 1940 |
| 2,455,653 | Bralley et al. | Dec. 7, 1948 |
| 2,517,968 | Bohl | Aug. 8, 1950 |

FOREIGN PATENTS

| | | |
|---|---|---|
| 532,543 | Belgium | Oct. 30, 1954 |
| 546,375 | Belgium | Mar. 23, 1956 |